US006304935B1

(12) United States Patent
Strongin

(10) Patent No.: US 6,304,935 B1
(45) Date of Patent: Oct. 16, 2001

(54) METHOD AND SYSTEM FOR DATA TRANSMISSION IN ACCELERATED GRAPHICS PORT SYSTEMS

(75) Inventor: Geoffrey S. Strongin, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/174,900

(22) Filed: Oct. 19, 1998

(51) Int. Cl.[7] .................................................. G06F 13/00
(52) U.S. Cl. .............................. 710/129; 345/520; 703/24
(58) Field of Search .................................. 710/126, 128, 710/129; 345/520; 703/23, 24, 25

(56) References Cited

U.S. PATENT DOCUMENTS 6,098,120 * 8/2000 Yaotani .................................. 710/16
6,167,476 * 12/2000 Olarig et al. ......................... 710/128

* cited by examiner

Primary Examiner—Glenn A. Auve
(74) Attorney, Agent, or Firm—Skjerven Morrill MacPherson, LLP; Stephen A. Terrille

(57) ABSTRACT

A method and system for data transmission in data processing systems, especially in the context of data processing systems utilizing the Accelerated Graphics Port (AGP) interface standard. The method and system provide an AGP-enabled device wherein is contained a command queue. The AGP-enabled device is connected to and communicates with an AGP-enabled bridge through and over a data bus. The AGP-enabled bridge has an AGP-enabled device mimicking unit. In one instance, the AGP-enabled device is an AGP-enabled graphics controller, the command queue is a graphics controller command queue, the AGP-enabled bridge is an AGP-enabled Northbridge, and the data bus is an AGP interconnect. In this instance, the graphics controller has a graphics controller full signal unit which controls and utilizes the PIPE# signal of the AGP-enabled graphics controller to indicate whether the graphics controller command queue can accept data. Further in this instance, the AGP-enabled Northbridge has an AGP-enabled graphics controller mimicking unit. In another instance, the AGP-enabled Northbridge has a CPU mimicking unit.

16 Claims, 4 Drawing Sheets

METHOD AND SYSTEM FOR DATA TRANSMISSION IN ACCELERATED GRAPHICS PORT SYSTEMS

BACKGROUND OF THE INVENTION

1. Field of the Invention

The present invention relates, in general, to a method and system to be utilized in data processing systems. In particular, the present invention relates to a method and system to be utilized in data processing systems wherein, for non-limiting example, the Accelerated Graphics Port (AGP) interface standard is utilized.

2. Description of the Related Art

Data processing systems are systems that manipulate, process, and store data and are notorious within the art. Personal computer systems, and their associated subsystems, constitute well known species of data processing systems. Personal computer systems in general and IBM compatible personal computer systems in particular have attained widespread use for providing computer power to many segments of today's modern society. A personal computer system can usually be defined as a desk top, floor standing, or portable microcomputer that includes a system unit including but not limited to a system processor and associated volatile and non-volatile memory, a display device, a keyboard, one or more diskette drives, one or more fixed disk storage devices, and one or more data buses for communications between devices. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

A computer system or data-processing system typically includes a system bus. Attached to the system bus are various devices that may communicate locally with each other over the system bus. For example, a typical computer system includes a system bus to which a central processing unit (CPU) is attached and over which the CPU communicates directly with a system memory that is also attached to the system bus.

In addition, the computer system may include a peripheral bus for connecting certain highly integrated peripheral components to the CPU. One such peripheral bus is known as the Peripheral Component Interconnect (PCI) bus. Under the PCI bus standard, peripheral components can directly connect to a PCI bus without the need for glue logic. Thus, PCI is designed to provide a bus standard on which highperformance peripheral devices, such as graphics devices and hard disk drives, can be coupled to the CPU, thereby permitting these high-performance peripheral devices to avoid the general access latency and the band-width constraints that would have occurred if these peripheral devices were connected to a low speed peripheral bus. Details on the PCI local bus standard can be obtained under the PCI Bus Specification, Revision 2.1, from the PCI Special Interest Group, which is hereby incorporated by reference in its entirety.

Relatively recently, techniques for rendering three-dimensional (3D) continuous-animation graphics have been implemented within PCs which, as will be explained below, have exposed limitations in the originally high performance of the PCI bus. The AGP interface standard has been developed to both (1) reduce the load on the PCI bus systems, and (2) extend the capabilities of systems to include the ability to provide 3D continuous-animation graphics with a level of quality previously found only on high-end computer workstations. The AGP interface standard is defined by the following document: Intel Corporation, *Accelerated Graphics Port Interface Specification*, Revision 1.0 (Jul. 31, 1996), which is hereby incorporated by reference in its entirety.

The AGP interface standard is specifically targeted to improve the efficiency of 3D continuous-animation graphics applications which utilize a technique know in the art as "texturing." Consequently, as background for understanding the data processing systems utilizing the AGP interface standard, it is helpful to have a brief overview of the data processing needs of 3D continuous animation graphics applications which utilize texturing, how they degrade the performance of PCI local bus systems, and how the AGP interface standard remedy this degradation of performance.

The display device of a computing system displays data in two-dimensions (2D). In order to create a 3D continuous animation graphical display, it is first necessary to create an object such that when the object is presented on the 2D display device, the object will be perceived by a human viewer as a 3D object. There are two basic ways in which this can be done. The first way is to use color and shading techniques to trick the human visual system into perceiving 3D objects on the 2D display device (essentially the same technique used by human artists when creating what appear to be 3D landscapes consisting of trees, rocks, streams, etc., on 2D canvases). This is a very powerful technique and creates superior 3D realism. The second way is to use mutually perpendicular lines (e.g., the well-known x, y, z coordinate system) to create geometric objects which will be interpreted by the human visual system as denoting 3D (essentially the same technique used by human architects to create the illusion of 3D in perspective view architectural drawings). However, the 3D illusion created by the use of mutually perpendicular lines is generally perceived to be inferior to that produced by the coloring and shading techniques.

Subsequent to creating a 3D object, the object must be animated. Animation is the creation of the illusion of continuous motion by the rapid sequential presentation of discrete images, or frames, upon the 2D display device. Animated 3D computer graphics are generated by taking advantage of a well know physiological property of the human visual system which is that if a person is shown a sequence of 15 discrete snapshots of a continuous motion, where each snapshot was taken in ¹/₁₅ second intervals, within one second, the brain will integrate the sequence together such that the person will "see," or perceive, continuous motion. However, due to person-to-person variations in physiology, it has been found empirically that a presentation of 20 images per second is generally the minimum rate at which the majority of people will perceive continuous motion without flicker, with 30 images per second tending to be the accepted as the optimal presentation speed.

The difficulty with 3D continuous animation computer graphics is that while the color and shading techniques (which are typically accomplished via bit-mapped images) produce superior 3D realism, such techniques are not easy for a computer to translate through geometric space for the creation of continuously varying sequential images necessary to produce the animation effect. On the other hand, the geometric shapes produced via the use of mutually perpendicular lines allow for easy computer manipulation in three dimensions, which allows the creation of sequential images necessary to produce the animation effect, but such geometric shapes result in inferior 3D realism. Recent 3D continuous-animation computer graphics techniques take advantage of both of the foregoing noted 3D techniques via the use of a middle ground approach known in the art "texturing."

In the use of texturing, the gross, overall structures of an object are denoted by a 3D geometric shape which is used to do geometric translation in three space, while the finer details of each side of the 3D object are denoted by bit mapped images (known in the art as "textures") which accomplish the color and shading techniques. Each time a new image of an object is needed for animation, the geometric representation is pulled from computer memory into a CPU, and the appropriate translations calculated. Thereafter, the translated geometric representation is cached and the appropriate bit-mapped images are pulled from computer memory into the CPU and transformed as appropriate to the new geometric translations so as to give the correct appearance from the viewpoint of the display device, the new geometric position, and any lighting sources and/or other objects that may be present within the image to be presented. Thereafter, a device known as the graphics controller, which is responsible for creating and presenting frames (one complete computer screen) of data, retrieves both the translated geometric object data and transformed texture data, "paints" the surfaces of the geometric object with the texture data, and places the resultant object into frame buffer memory (a storage device local to the graphics controller wherein each individual frame is built before it is sent to the 2D display device). It is to be understood that the foregoing noted series of translations/transformations is done for each animated object to be displayed.

It is primarily the technique of texturing which has exposed the performance limitations of PCI bus systems. It has been found that when an attempt is made to implement 3D continuous-animation computer graphics application wherein texturing is utilized within PCI bus systems, the texturing data results in effective monopolization of the PCI bus by the application, unless expensive memory is added to the graphics controller. That is, texturing using the PCI bus is possible. However, due to PCI bandwidth limitations, the textures must fit into the memory directly connected to the graphics card. Since there is a direct correlation between the size of textures and the realism of the scene, quality can only be achieved by adding memory to the graphics card/controller. It was this realization that prompted the development of the AGP interface specification: with the AGP interface standard, texture size can be increased using available system memory. The AGP interface standard is intended to remedy the exposed limitations of the PCI local bus systems by providing extended capabilities to PCI bus systems for performing 3D continuous-animation computer graphics, as will become clear in the following detailed description.

The AGP interface standard accomplishes the foregoing via a rather indirect process. Under the AGP interface standard, a CPU independently processes the geometric and texturing data associated with each object to be displayed in a scene. Subsequent to processing the geometric and texturing data, the CPU writes the geometric and texturing data back into system memory. Thereafter, the CPU informs a graphics processor that the information is ready, and the graphics processor retrieves the information from the system memory.

It may seem as if it would be more efficient to have the CPU write the processed geometric and texturing data directly to the graphics processor, thereby avoiding the intermediate steps of writing and retrieving data from system memory. Such is not the case under the AGP standard. Under the AGP standard, serious inefficiencies are introduced when attempt is made to write data directly to an AGP device.

It has been noted that the normal AGP mode of operation is for the CPU to write processed data to system memory and thereafter to direct an AGP device to read the processed data from system memory. This is typically done because the theoretical peak efficiency of data transmission to an AGP device from system memory, via AGP interconnect through an AGP capable Northbridge, is 533 Mbytes/sec at a bus speed of 133 MHz data transfer rate (a bus speed of 66 MHz, but utilizing both rising and falling clock edges). In contrast, the theoretical peak efficiency of data transmission from the CPU writing directly to the AGP device, via AGP interconnect through an AGP capable Northbridge, is 266 Mbytes/sec at a bus speed of 66 MHz.

In actuality the practicable data transmission rate from the CPU directly to the AGP device is much lower than that noted. There are multiple reasons for this, but one of the most significant is that under the AGP standard the CPU writing directly to an AGP device uses PCI protocol. This means that the pipelined operation of the AGP interconnect is not available for CPU to AGP device direct data transmission; rather, the CPU is reduced to using PCI burst mode as its most efficient tactic for data transfer.

When the CPU writes directly to the AGP device, it writes into a temporary storage location, or "buffer," contained within the AGP device. This buffer is generally known as the command queue buffer. Because the CPU is writing to the AGP device via the utilization of PCI protocol, the CPU must "poll" (ask) the AGP device regarding the AGP device's available storage prior to the CPU writing data to the AGP device. Such polling results in significant inefficiencies, on multiple levels, a few of which will now be detailed.

A first inefficiency arises due to the fact that in order to do such polling, the CPU must communicate with the AGP device over two buses: the CPU bus connecting the CPU to the Northbridge, and the AGP interconnect bus connecting the Northbridge to the AGP device. A second inefficiency arises due to the fact that when the AGP answers back, both of the foregoing buses must be "turned around"—reconfigured so that communication is now flowing from the AGP device back to the CPU—which introduces time inefficiency. A third inefficiency arises due to the fact that the CPU is task based, so if the AGP answers back that its command queue is full, the CPU will "spin," or just cycle without doing any useful computation, until the AGP device indicates that command queue space has become available. Yet a fourth inefficiency arises from the fact that when the command queue becomes available, both buses must again be turned around such that the CPU can transfer data to the AGP device.

The foregoing noted inefficiencies arise directly from the AGP interface standard itself. It is undeniable that the AGP interface standard is highly useful and that AGP compliant devices are highly desirable. However, it is likewise clear that inefficiencies exist and arise from the AGP standard defining the acceptable manner of direct CPU to AGP device data communication. It is therefore apparent that a need exists in the art for a method and system which will substantially conform to the established AGP interface standards, yet also substantially minimize the computational inefficiencies associated with writing data directly from a CPU to an AGP compliant device.

SUMMARY OF THE INVENTION

It has been discovered that a method and system can be produced which will substantially conform to the established AGP standards, yet also substantially minimize the computational inefficiencies associated with writing data directly from a CPU to an AGP compliant device. The method and system provide an AGP-enabled device wherein is contained a command queue. The AGP-enabled device is connected to and communicates with an AGP-enabled bridge through and over a data bus. The AGP-enabled bridge has an AGP-enabled device mimicking unit. In one instance, the AGP-enabled device is an AGP-enabled graphics controller, the command queue is a graphics controller command queue, the AGP-enabled bridge is an AGP-enabled Northbridge, and the data bus is an AGP interconnect. In this instance, the graphics controller has a graphics controller full signal unit which controls and utilizes the PIPE# signal of the AGP-enabled graphics controller to indicate whether the graphics controller command queue can accept data. Further in this instance, the AGP-enabled Northbridge has an AGP-enabled graphics controller mimicking unit. In another instance, the AGP-enabled Northbridge has a CPU mimicking unit.

The foregoing summary is illustrative and is intended to be in no way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative and should not be taken to be limiting.

Figure 1:
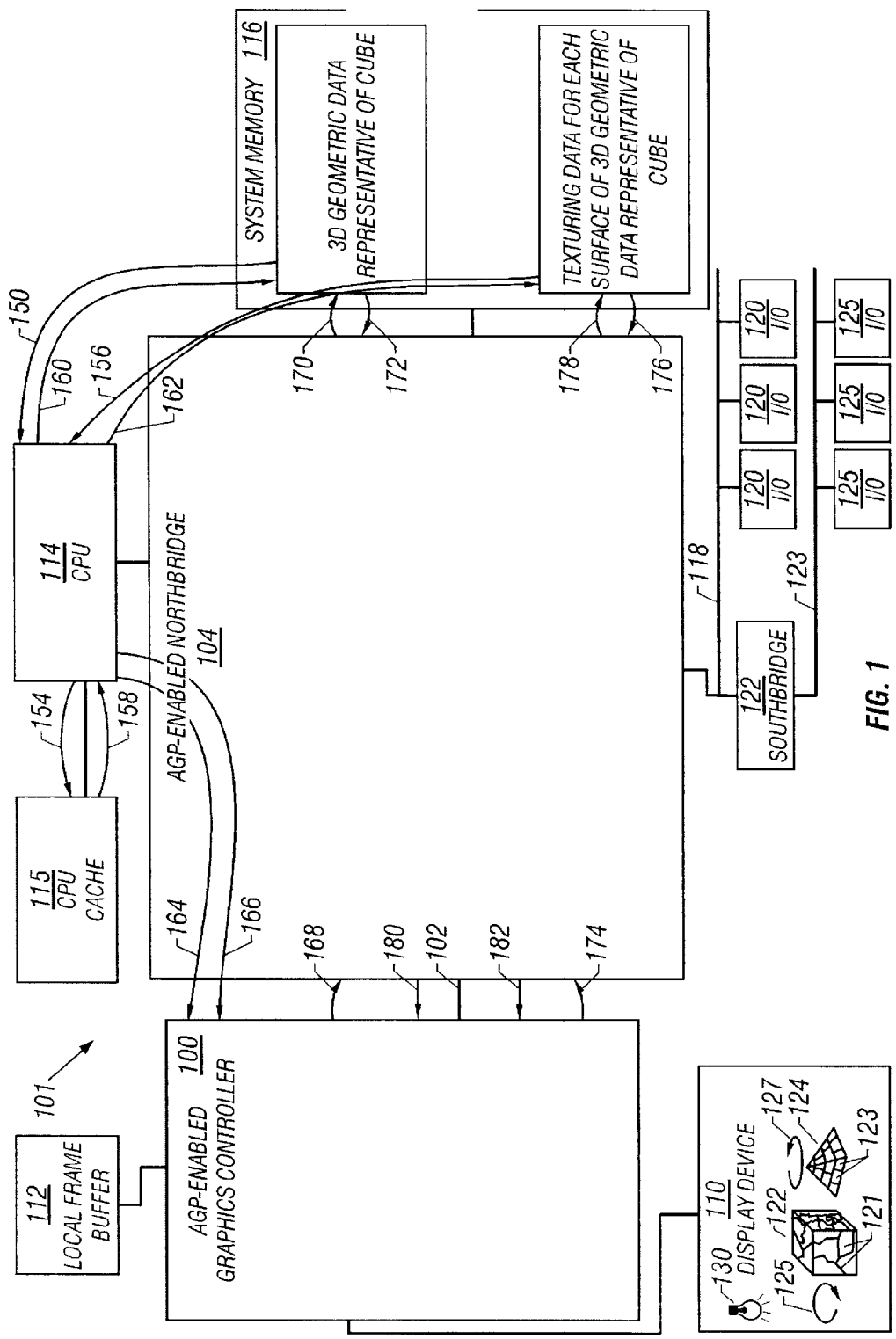
FIG. 1 shows a high-level component diagram depicting a related art AGP-enabled data processing system which forms an environment wherein one or more embodiments of the present invention may be practiced.

Referring now to FIG. 1, shown is a high-level component diagram depicting an AGP-enabled data processing system 101 which forms an environment wherein one or more embodiments of the present invention may be practiced. In addition, FIG. 1 will be utilized to show, in broad overview, how the use of texturing to create 3D continuous-animation produces data bottlenecking in non-AGP systems, and how AGP-enabled systems alleviate such data bottlenecking as well as give extended capabilities. Shown are three building blocks of AGP: AGP-enabled graphics controller 100, AGP interconnect 102 (a data bus), and AGP-enabled Northbridge 104. Not shown, but deemed present is a fourth building block of AGP: an AGP-enabled operating system. The term AGP-enabled is intended to mean that the so-referenced components are engineered such that they interface and function under the standards defined within the AGP interface specification, referenced above. Further depicted are display device 110, local frame buffer 112, Central Processing Unit (CPU) 114, system memory 116, Peripheral Component Interconnect (PCI) bus 118, various Input-Output (I/O) devices 120, Southbridge 122, Industry Standard Architecture (ISA) bus 123, and I/O devices 125.

Generally, each bus utilizes an independent set of protocols (or rules) to conduct data (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a system bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 104, in that it is to be understood that it translates and coordinates between the various data buses which communicate through AGP-enabled Northbridge 104. However, it is also to be understood that the term bridge as used herein can also encompass a hardware device in the form of an interface through which two similar types of buses are connected.

It has been explained previously that in order to give the illusion of motion, it is common to display at least 30 images a second. In 3D continuous-animation computer graphics this is usually done by creation of a sequence of entire frames (or discrete computer screen images) in local frame buffer 112 memory, which are then displayed in sequence on display device 110. The creation of frames must be at such a rate that at least 20 (but preferably 30) different frames can be displayed every second.

Note that display device 110 shows two 3D animated objects, cube 122 shown as being composed of a mosaic of stones 121 and pyramid 124 shown as being composed of number of bricks 123. Cube 122 and pyramid 124 are shown as having a given rate and direction of rotation 125, 127, respectively. Also shown is a stationary 3D object, single light source 130, which is shining upon cube 124 and pyramid 126.

Since texturing is being utilized, the gross shape of cube 122 is described by both a 3D geometric object (most likely a simple geometric cube) and associated texture maps (typically bit mapped images) depicting the mosaic of stones 121 for each side of the 3D geometric object (as shown, it is assumed that the 3D geometric object data and the associated texturing data for cube 122 have been previously read into system memory 116 from a storage unit (not shown)). Since cube 122 is to be portrayed in motion, CPU 114 first retrieves 150 the 3D geometric object data describing cube 122 from system memory 116, and performs a geometric transformation upon the data consistent with the last computed position, and defined trajectory and/or rate and direction of rotation 125 of cube 122, and thereafter caches 154 the transformed 3D geometric object data in CPU cache 115. Thereafter, CPU 114 retrieves 156 the texturing data associated with the 3D object representative of cube 122, retrieves 158 the cached geometric data, and computes the appropriate transformation of the texturing data consistent with the newly computed/translated 3D geometric object position and lighting source 130. Thereafter, CPU 114 stores 160, 162 both the translated 3D object data and the associated transformed texturing data for cube 122 into system memory 116. Subsequently, CPU 114 informs 164, 166 AGP-enabled graphics controller 100 that the translated 3D object data and the associated transformed texturing data for cube 122 are ready in system memory 116. In response, AGP-enabled graphics controller 100, via AGP interconnect 102, requests 168 that AGP-enabled Northbridge 104 retrieve 170, 172 the translated 3D data and requests 174 that AGP-enabled Northbridge 104 retrieve 176, 178 the associated transformed texturing data for cube 122 from system memory 116. Thereafter, AGP-enabled Northbridge 104 returns 180 the translated 3D geometric data and returns 182 the associated transformed texturing data for the 3D geometric object and delivers it to AGP-enabled graphics controller 100 via AGP interconnect 102. Thereafter, AGP-enabled graphics controller 100 utilizes the 3D geometric object data and the associated texturing data to create a representation of cube 122, which is subsequently located into the correct location within local frame buffer 112.

Notice that in order to create just one frame of data such as that (i.e., containing cube 122, pyramid 124, and light source 130) depicted within display device 110, the foregoing series of operations for cube 122 (calculating a next geometric position for a 3D object, thereafter adjusting texture data given the next-computed geometric position and lighting source 130, transferring such 3D object and associated texturing data to AGP-graphics controller 100, combining the data to get a correct 3D object, and transferring the object to local frame buffer 112) must be repeated for pyramid 124 since pyramid 124 is to be depicted with rate and direction of rotation 127 (i.e., since pyramid 124 is to be animated). Furthermore, the 3D geometric data and associated texture map for light source 130 must also retrieved by AGP-enabled graphics controller via communication with AGP-enabled Northbridge 104 and over AGP interconnect 102, and subsequently be loaded into its appropriate coordinates in local frame buffer 112. All objects now present in local frame buffer 112, the frame is now complete and subsequently transferred out of local frame buffer 112, and presented upon display device 110. Notice that, just for this one frame of data, each animated object cube 122 and pyramid 124 required at least two separate computations: one for translating geometric position and the other for transforming the texture data. Furthermore, for each object in motion, such translated geometric data and associated texturing data must ultimately reach AGP-enabled graphics controller 100, which as has been shown, requires multiple data transfers over multiple buses. From this it can be seen that computation and data transfer for 3D continuous-animation computer graphics can become significant factors for frames having tens, hundreds, or more animated objects.

Those skilled in the art will recognize that prior to the advent of the AGP interface standards, virtually all 3D geometric object and associated texturing data had to travel to a graphics controller over PCI bus 118, which was the significant limiting factor in creating realistic 3D continuous-animation graphics using texturing. Those skilled in the art will also recognize that an increase in 3D realism is generally accomplished by increased resolution of the bit-mapped images used to provide the texture for the 3D geometric shapes, but that such increased resolution gives rise to significantly increased computational and data transfer needs. As demonstrated, the AGP interface standard has been designed to remedy the PCI bus bottleneck by creating a direct data transfer route between AGP-enabled graphics controller 100 and system memory 116, which makes the creation of realistic 3D continuous-animation graphics more efficient. The AGP interface standard also has the concomitant benefit of restoring the high performance of the PCI local bus 118, since it no longer serves as the primary data bus for graphics data.

In light of the data flow discussed in relation to FIG. 1, it can be seen that under the AGP interface standard the data transfer is somewhat indirect, in that while the graphics data is ultimately destined for AGP-enabled graphics controller 100, it arrives at AGP-enabled graphics controller 100 by the relatively circuitous route of first going back into system memory 116 and then ultimately being transferred from system memory 116 through AGP-enabled Northbridge 104 into AGP-enabled graphics controller 100. The reason why this is done will become apparent in the discussion of FIG. 2.

Figure 2:
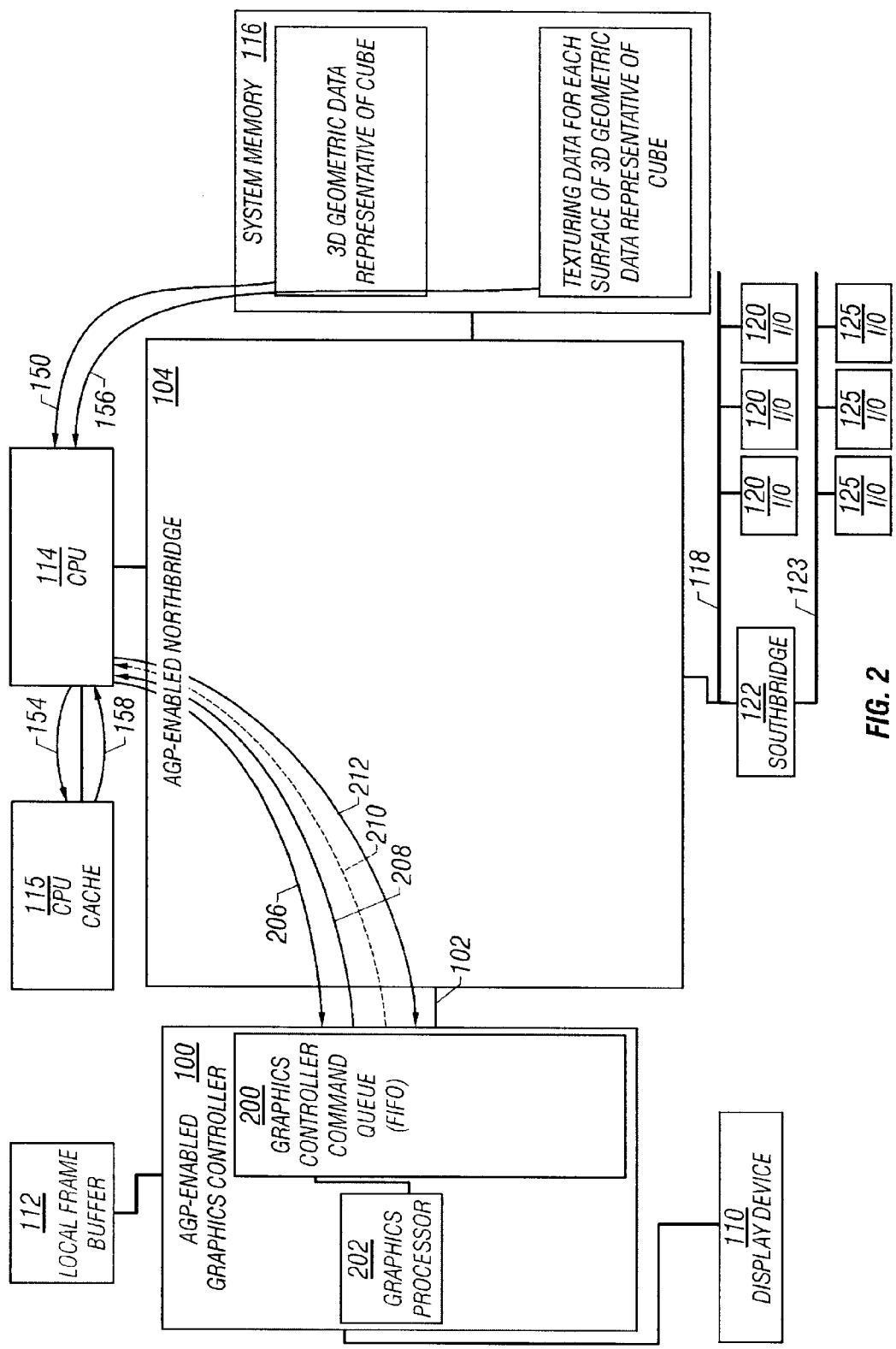
FIG. 2 depicts a high-level block diagram illustrating in broad overview how the AGP-enabled system of FIG. 1, which forms an environment wherein one or more embodiments of the present invention may be practiced, writes data directly to an AGP enabled device under the AGP interface standard.

Referring now to FIG. 2, shown is a high-level block diagram illustrating in broad overview how the AGP-enabled system of FIG. 1, which forms an environment wherein one or more embodiments of the present invention may be practiced, writes data directly to an AGP enabled device under the AGP interface standard. Shown are AGP-enabled graphics controller 100 wherein are contained a graphics controller command queue 200 (depicted for illustrative purposes as a First-In First-Out (FIFO) buffer) and graphics processor 202, AGP interconnect 102 (a data bus), and AGP-enabled Northbridge 104. The remaining shown components function substantially similar to the like-numbered components described in relation to FIG. 1.

Depicted in FIG. 2 is that, rather than respectively storing 160, 162 the transformed 3D geometric data and texturing data for each surface of the 3D geometric data representative of cube 122 as was described in FIG. 1, CPU 114 transfers such transformed 3D geometric data and texturing data directly to AGP-enabled graphics controller 100. Illustrated is that, under the dictates of the AGP interface standard, CPU 114 accomplishes the foregoing by polling 206 AGP-enabled graphics controller 100 as to how much data graphics controller command queue (FIFO) 200 can accept (i.e., as to whether the queue is full or has space available).

AGP-enabled graphics controller 100 responds with a signal 208 indicating either that graphics controller command queue (FIFO) 200 is full or that graphics controller command queue (FIFO) 200 can accept some specified amount of data. If signal 208 indicates that graphics controller command queue (FIFO) 200 is full, CPU 114 "spins" (a term of art indicating that CPU 114 cycles are transpiring while CPU 114 waits for buffer space and does no useful work) until a subsequent query (e.g., such as signal 206) by CPU 114 results in a subsequent signal 210 (shown as an optional dotted line since it may not always be necessary if the first query indicated space was available) indicating that graphics controller command queue (FIFO) 200 can accept a specified amount of data.

In response to an indication that graphics controller command queue (FIFO) 200 can accept a specified amount of data, CPU 114 transfers 212 the specified amount of data into graphics controller command queue (FIFO) 200 through AGP-enabled Northbridge 104 via CPU local bus 204 and AGP interconnect 102. Subsequent to completion of the transfer of the specified amount of data, if CPU 114 has more data to send, it re-polls AGP-enabled graphics controller 100 until a signal (e.g., 208 or 210) is received by CPU 114 from AGP-enabled graphics controller 100 indicating that a specified amount of data can be accepted, after which CPU 114 may send the specified amount of data.

Graphics controller command queue 200 is emptied by graphics processor 202. Subsequent to emptying, graphics controller command queue 200 can accept more data. Because graphics controller command queue 200 tends to be relatively small (due to cost and design constraints) it tends to serve as a data transfer bottleneck.

It was described in the background section, above, that under the AGP interface standard, CPU 114 must access and deliver data to AGP-enabled graphics controller 100 via use of the PCI protocol. Because of this, the data transfer from CPU 114 to the graphics controller command queue 200 within AGP-enabled graphics controller 100 is much lower than the normal data transfer rate of AGP interconnect 102 since the PCI protocol does not allow for AGP-type pipelining (the fastest data transfer available under PCI is burst mode). It is because of the foregoing noted data bottlenecks that direct data transfer from CPU 114 to AGP-enabled graphics controller 100 has not been an attractive option within AGP-enabled systems. That is, but for the present invention, direct data transfer from CPU 114 to AGP-enabled graphics controller 100 would remain an unattractive option in AGP-enabled systems.

Figure 3:
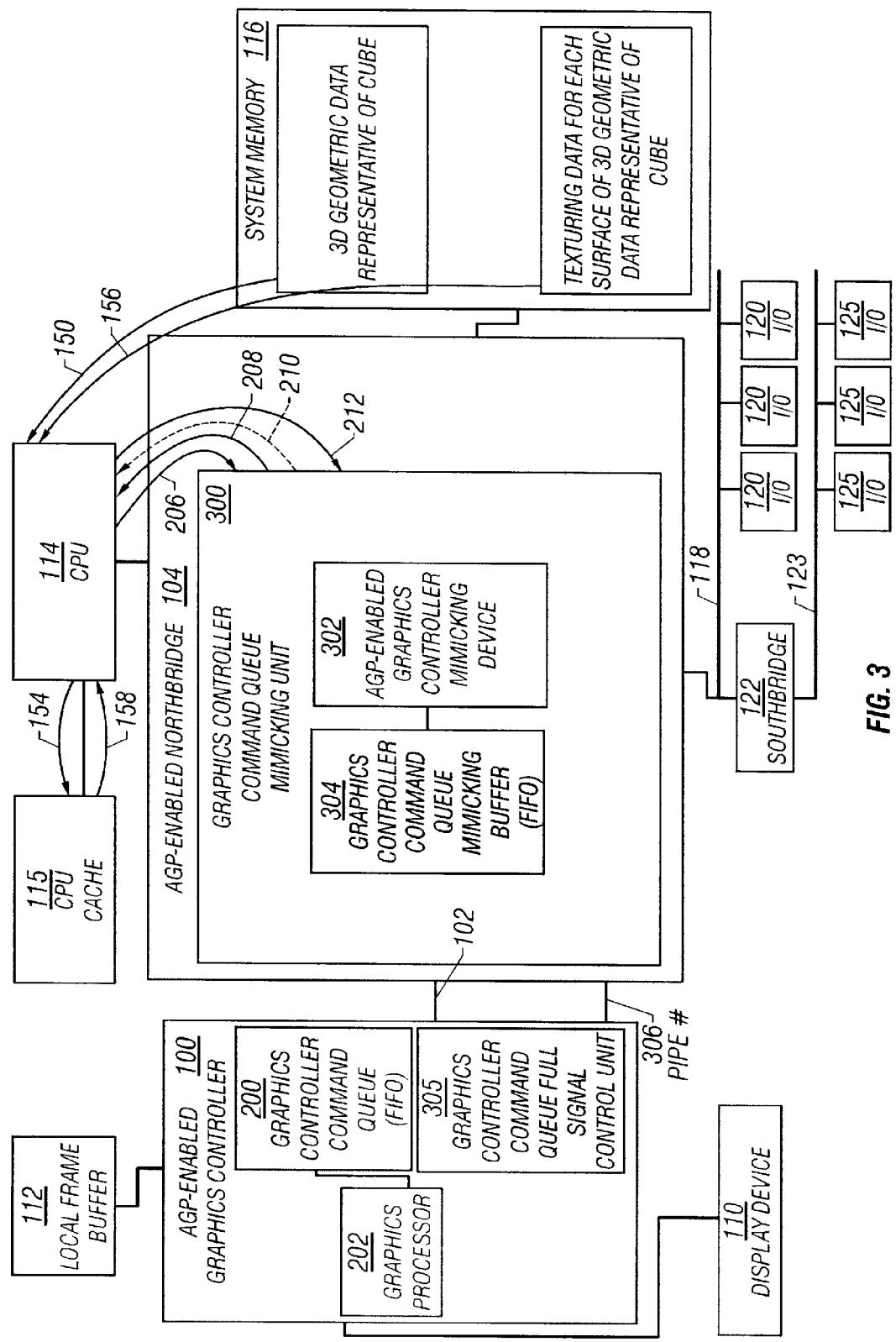
FIG. 3 illustrates pictographically an embodiment of the present invention.

With reference now to FIG. 3, which is a high-level pictographic diagram depicting an embodiment of the present invention, shown is graphics controller command queue mimicking unit 300. Like numbered components and operations equating to like-numbered components and operations of FIGS. 1 and 2 function substantially as described previously. Furthermore, not shown, but deemed present is the fourth building block of AGP: an AGP-enabled operating system which provides support for features of the present invention as described below (although those skilled in the art will recognize that some modification of device drivers will be necessary, those skilled in the art will recognize that the AGP-enabled operating system itself will require no modification).

Depicted is that CPU 114 is sending exactly the same control signals 206 and information 212 to and receiving exactly the same control signals 208, 212 from graphics controller command queue mimicking unit 300 as such signals were described in relation to FIG. 1 and FIG. 2. That is, graphics controller command queue mimicking unit 300 is designed such that it appears, in every respect, to CPU 114 that CPU 114 is communicating with graphics controller command queue 200 in the fashion it ordinarily would in the absence of graphics controller command queue mimicking unit 300. This aspect is illustrated by AGP-enabled graphics controller mimicking device 302 which responds, in all respects (e.g., the addressing is the same, the control signals are the same, the protocols used are the same, etc.), just as AGP-enabled graphics controller responds to CPU 114 communications in the absence of graphics controller command queue unit 300.

Notice that in FIG. 3 the control signals 206–212 normally transmitted between AGP-enabled graphics controller 100 and AGP-enabled Northbridge 104, as illustrated in FIG. 2, are not transmitted between AGP-enabled graphics controller 100 and AGP-enabled Northbridge 104. This is because in this embodiment AGP-enabled graphics controller 100 and AGP-enabled Northbridge 104 have been modified such that graphics controller command queue 200 is no longer polled as to whether it can accept data; rather, as discussed below, data flow into graphics controller command queue 200 is controlled by use of a buffer management signal which indicates whether or not graphics controller command queue mimicking unit 300 should transmit data.

In one embodiment, graphics controller command queue mimicking unit 300 is implemented by AGP-enabled graphics controller mimicking device 302 in conjunction with an extremely large graphics controller command queue mimicking buffer (in one embodiment, a FIFO buffer) 304. The buffer management signal is implemented by requiring that AGP-enabled graphics controller 100 function in side-band addressing (SBA) mode. Under the AGP interface standard, when AGP-enabled graphics controller 100 is functioning in SBA mode, one of the pins under the AGP-interface standard is not ordinarily used: the pin defined to equate to the AGP interface specification PIPE# signal. Since this pin is not used in SBA mode, it can be redefined to function as the buffer management signal.

In this embodiment, AGP-enabled Northbridge 104 is responsible for dumping data from graphics controller command queue mimicking buffer 304 to AGP-enabled graphics controller 100. When there is data in graphics controller command queue mimicking buffer 304, AGP-enabled Northbridge 104 checks the status of the PIPE# signal 306 to determine whether any graphics controller command queue 200 buffers are available. If a graphics controller command queue 200 buffer is available, AGP-enabled Northbridge 104 generates PCI cycles to burst out the data in graphics controller command queue mimicking buffer 304. AGP-enabled Northbridge 104 samples the state of PIPE# signal 306 with each data transfer in order to determine whether the next clock should transmit another Quadword (i.e., whether a burst should occur on the next clock), or whether the data transmission should be terminated (because the PIPE# signal 306 indicates that the graphics controller command queue 200 is full). In this implementation, AGP-enabled graphics controller 100 has graphics controller command queue full signal control unit 305 which communicates with graphics controller command queue 200 and ensures that PIPE# is asserted when sufficient buffer space is available in the graphic controller command queue 200 of AGP-enabled graphics controller 100 device to allow a long burst on AGP interconnect 102. Thus, in a sense, in this scheme control has been transferred over to AGP-enabled graphics controller 100 which will ensure that data will be transmitted into AGP-enabled graphics controller 100 essentially just as fast as the data can be accepted.

Notice that since graphics controller command queue mimicking buffer 304 has substantially larger storage space than graphics controller command queue 200, there will be a substantial reduction in the bottlenecking ordinarily caused by graphics controller command queue 200 in the absence of the present invention. Notice further that the amount of cycles in which CPU 114 "spins" while waiting for the data bus will also be substantially alleviated because the size of graphics controller command queue mimicking buffer 304 will typically ensure that space will be available within graphics controller command queue mimicking unit 300, and thus CPU 114 will rarely have to "wait" before it writes data into graphics controller command queue mimicking unit 300.

Figure 4:
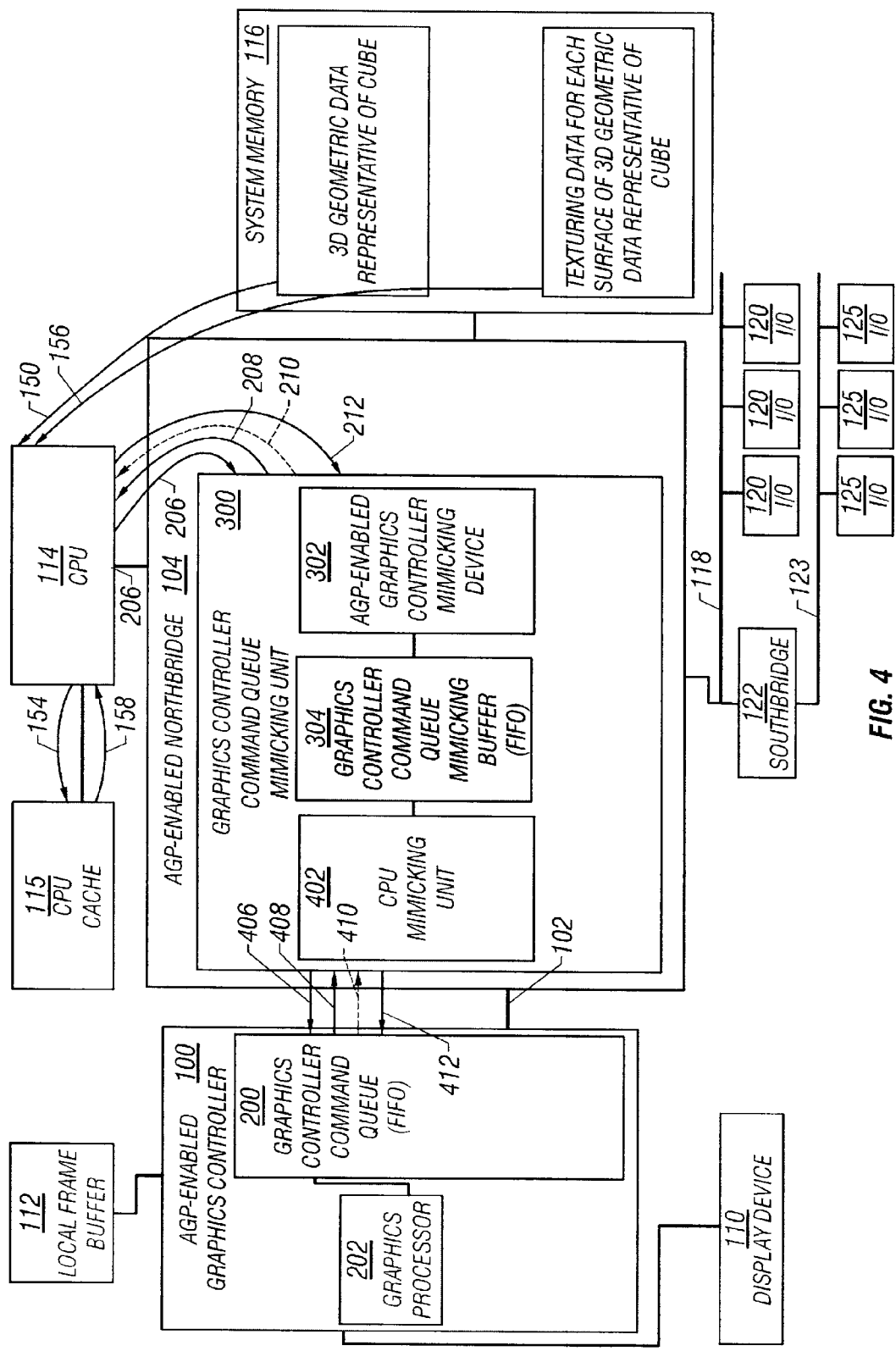
FIG. 4 illustrates pictographically another embodiment of the present invention.

Referring now to FIG. 4, which is a high-level pictographic diagram depicting another embodiment of the present invention, like numbered components and operations equating to like-numbered components and operations of FIGS. 1, 2, and 3 function as described previously. In the embodiment depicted, unlike the embodiment described in relation to FIG. 2, AGP-enabled graphics controller 100 is left unmodified, and logic circuitry is added to AGP-enabled Northbridge 104 sufficient that AGP-enabled Northbridge 104 will interact with AGP-enabled graphics controller 100 in exactly the same fashion as is ordinarily done by CPU 114 when writing directly to graphics controller command queue 200. This is indicted in FIG. 4 by CPU mimicking unit 402.

The fact that CPU mimicking unit 402 responds and interacts with AGP-enabled graphics controller exactly like CPU 114 does is further illustrated by control/data signals 406–412 which function in substantially the same fashion as control/data signals 206–212. However, such signals 406–412 are depicted by different reference numerals in order to illustrate the fact that data transfer out of graphics controller command queue mimicking unit 300 and into graphics controller command queue 200 is the result of communication between AGP-enabled graphics controller 100 and CPU mimicking unit 402 of AGP-enabled Northbridge 104 where such communication is essentially independent from the communication between CPU 114 and AGP-enabled graphics controller mimicking device 302 of AGP-enabled Northbridge 104. Lastly, note that in this embodiment, both the behaviors of the CPU 114 and AGP-enabled graphics controller 100 are effectively mimicked, such that the present invention can be implemented by only modifying the logic circuitry of AGP-enabled Northbridge 104.

The foregoing detailed description set forth various embodiments of the present invention via the use of block diagrams, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention is implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this specification.

OTHER EMBODIMENTS

Several various embodiments have been described above, and it will be obvious to those skilled in the art that, based upon the teachings herein, changes and modifications may be made without departing from this invention and its broader aspects. That is, all examples set forth herein are intended to be exemplary and non-limiting.

For example, while the components discussed above have been described dependent upon the PIPE# signal, it will be appreciated that the selection of this signal is a design choice and that the functions described related to the PIPE# may be embodied via a number of different signals. Accordingly, the presence and location of any described functions are not intended to be limiting.

Also for example, while the graphics controller command queue mimicking buffer has been described as being implemented in a FIFO, it will be appreciated that other types of buffers can be used to implement the device. Accordingly, the described architectures are not intended to be limiting.

Also for example, while the embodiments have been described in the context of the AGP interface standard, it will be recognized that the embodiments herein can be applied to other similar problems which exist in other non-AGP interface standard systems wherein similar problems analogous to those solved by the present invention exist. For example, systems wherein mimicking a peripheral device within a bridge can improve system performance, and especially data throughput performance. Thus, the specific protocols described are not intended to be limiting.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A system comprising:
   a bridge; and
   said bridge having a device mimicking unit,
      a device having a command queue, the device having a command queue including an Accelerated Graphics Port-enabled graphics controller having a graphics controller command queue, the Accelerated Graphics Port-enabled graphics controller including a graphics controller buffer full signal control unit, said graphics controller buffer full signal control unit operably connected to a pipe# pin of said Accelerated Graphics Port-enabled graphics controller; and
      said device operably coupled to said bridge via a first bus.

2. The system of claim 1, wherein said first bus further includes an Accelerated Graphics Port Interconnect.

3. The system of claim 1, wherein said bridge further includes:
   an Accelerated Graphics Port-enabled Northbridge.

4. The system of claim 1, further comprising:
   a data source operably connected via a second bus to the bridge.

5. The system of claim 4, wherein said data source further includes:
   a Central Processing Unit.

6. The system of claim 4, wherein said second bus further includes:
   a Central Processing Unit bus.

7. A system comprising:
   a bridge; and
   said bridge having a device mimicking unit, said device mimicking unit including
      an Accelerated Graphics Port-enabled graphics controller mimicking unit;
      said Accelerated Graphics Port-enabled graphics controller mimicking unit further including
         a graphics controller command queue mimicking buffer.

8. A system comprising:

a bridge; and said bridge having a device mimicking unit, said device mimicking unit including an Accelerated Graphics Port-enabled graphics controller mimicking unit;

said Accelerated Graphics Port-enabled graphics controller mimicking unit further including a Central Processing Unit mimicking unit.

9. A method comprising:

accepting data destined for a first device by mimicking a behavior of the first device within a second device;

transmitting data destined for the first device from the second device to the first device, wherein said transmitting the data destined for the first device from the second device to the first device further includes:

transmitting data destined for a first Accelerated Graphics Port-enabled device from a second Accelerated Graphics Port-enabled device in response to a signal that indicates that the first Accelerated Graphics Port-enabled device can accept the data.

10. The method of claim 9, wherein said accepting data destined for a first device by mimicking a behavior of the first device within a second device further includes:

accepting data destined for an Accelerated Graphics Port-enabled graphics controller by mimicking the behavior of the Accelerated Graphics Port-enabled graphics controller within an Accelerated Graphics Port-enabled Northbridge.

11. The method of claim 9, wherein said accepting data destined for a first device by mimicking a behavior of the first device within a second device further includes:

storing data destined for an Accelerated Graphics Port-enabled device in storage other than that of a first Accelerated Graphics Port-enabled device.

12. The method of claim 11, wherein said storing data destined for an Accelerated Graphics Port-enabled device in storage other than that of the first Accelerated Graphics Port-enabled device further comprises:

storing data destined for an Accelerated Graphics Port-enabled graphics controller in storage within an Accelerated Graphics Port-enabled Northbridge.

13. The method of claim 9 wherein said transmitting data destined for a first Accelerated Graphics Port-enabled device from a second Accelerated Graphics Port-enabled device in response to a signal that indicates that the first Accelerated Graphics Port-enabled device can accept the data further comprises:

transmitting data destined for an Accelerated Graphics Port-enabled graphics controller from an Accelerated Graphics Port-enabled Northbridge in response to a buffer management signal that indicates that a command queue of an Accelerated Graphics Port-enabled graphics controller can accept the data destined for the Accelerated Graphics Port-enabled graphics controller.

14. A method comprising:

accepting data destined for a first device by mimicking a behavior of the first device within a second device;

transmitting data destined for the first device from the second device to the first device, said transmitting the data destined for the first device from the second device to the first device further includes:

mimicking a behavior of a third device;

transmitting data destined for a first Accelerated Graphics Port-enabled device from a second Accelerated Graphics Port-enabled device in response to a signal, appropriate to the third device, which indicates that the first Accelerated Graphics Port-enabled device can accept the data.

15. The method of claim 14, wherein said mimicking a behavior of a third device further comprises:

mimicking the behavior of a Central Processing Unit.

16. The method of claim 14, wherein said transmitting data destined for a first Accelerated Graphics Port-enabled device from a second Accelerated Graphics Port-enabled device in response to a signal, appropriate to the third device, which indicates that the first Accelerated Graphics Port-enabled device can accept the data further comprises:

transmitting data destined for an Accelerated Graphics Port-enabled graphics controller from an Accelerated Graphics Port-enabled Northbridge in response to a signal, appropriate to a Central Processing Unit, which indicates that a command queue of the Accelerated Graphics Port-enabled graphics controller can accept the data destined for the Accelerated Graphics Port-enabled graphics controller.

* * * * *